United States Patent
Baginski et al.

(10) Patent No.: US 6,413,185 B1
(45) Date of Patent: Jul. 2, 2002

(54) DRIVING SYSTEM FOR AN INDUSTRIAL TRUCK

(75) Inventors: Ralf Baginski, Neetze; Rainer Bruns, Hamburg, both of (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 68 days.

(21) Appl. No.: 09/714,631

(22) Filed: Nov. 16, 2000

(30) Foreign Application Priority Data

Nov. 17, 1999 (DE) .......................................... 199 55 311

(51) Int. Cl.[7] .............................. F16H 37/02; F16H 3/72; F16H 37/06; B60K 1/00
(52) U.S. Cl. ............................ 475/208; 475/5; 475/211; 180/65.2; 180/65.7
(58) Field of Search ................................ 475/208, 211, 475/212, 213, 218, 5, 6; 180/65.2, 65.7, 65.3; 477/2, 7

(56) References Cited

U.S. PATENT DOCUMENTS

| 5,846,155 A | * | 12/1998 | Taniguchi et al. | ............. | 477/2 |
| 6,306,057 B1 | * | 10/2001 | Morisawa et al. | ............. | 475/5 |

FOREIGN PATENT DOCUMENTS

| DE | 28 05 594 | 8/1979 |
| DE | 37 43 289 A1 | 6/1989 |
| DE | 3625 141 C2 | 8/1990 |
| DE | 197 47 459 A1 | 5/1999 |
| DE | 198 03 160 C1 | 5/1999 |
| EP | 0 755 818 A2 | 6/1996 |
| EP | 0 908 343 A2 | 10/1998 |

* cited by examiner

*Primary Examiner*—Dirk Wright
*Assistant Examiner*—Tisha D. Lewis
(74) *Attorney, Agent, or Firm*—Vidas, Arrett & Steinkraus P.A.

(57) ABSTRACT

A driving system for an industrial truck having a driving device and at least one unit for working motions of the industrial truck, comprising: A combustion engine; an adjustable transmission coupled to the engine shaft; a gear assembly the first input shaft of which is directly coupled to the shaft of the combustion engine and the second input shaft of which is coupled to the driven shaft of the adjustable transmission; an electric motor the shaft of which is coupled to a third input shaft of the gear assembly; a change-over transmission between the driven shaft of the gear assembly (24) and the driving wheels of the industrial truck; a battery which is connected to the electric motor via an electronic power unit; a sensor system which measures at least the speeds of the combustion engine, the electric motor, and the output shafts of the change-over transmission and, if necessary, the charging state of the battery and generates appropriate output signals; a shaft coupled to the driving system for driving the unit for the working motions of the industrial truck; a governing device which controls the speed of the motors and the gear ratio of the adjustable transmission and actuates the rotary brake and shifts the change-over transmission according to the desired-value signals of the desired-value transmitters actuated by the driver of the industrial truck and on the basis of the output signals of the sensor system.

9 Claims, 6 Drawing Sheets

DRIVING SYSTEM FOR AN INDUSTRIAL TRUCK

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to a driving system for industrial trucks.

The primary drive for industrial trucks either is an internal combustion engine or an electric motor with the motor being fed by a battery. Either driving mode has its advantages and disadvantages. Industrial trucks using combustion engines cannot be used permanently in closed rooms because of the emission of harmful substances. Therefore, electric motor driven industrial trucks are provided for such applications. For such drives, however, it is necessary to carry along a large and heavy battery which needs to be charged from time to time. The explanations which follow and the invention exclusively refer to industrial trucks which have a combustion engine.

Industrial trucks not only require to be driven, but also require that working energy be provided for most various functions, especially for lifting and lowering the load-carrying means, for inclining, pushing, and rotating the lift frame as well as for driving specific attachments.

Like in other power-driven vehicles, a transmission is required in employing combustion engines for industrial trucks in order to obtain the desired torque and the desired number of revolutions. Using a change-speed transmission including a clutch, however, is very unfavourable for industrial trucks. Therefore, it hardly has an application in practice.

Another alternative is to use a hydrodynamic transducer in combination with single-step or multi-step reduction gears. This solution proves to be disadvantageous at slow travelling speeds because efficiency is very unfavourable in this operating state. Moreover, a clutch function is required to independently operate the lifting function.

Another alternative is to use a hydrostatic transmission. This allows relative high efficiency at a slow travel, but involves low efficiency at high travelling speeds. More drawbacks are the relatively high construction expenditure which is due to the high hydraulic pressures up to 400 bar and the system's susceptibility to defects, especially with regard to leakage.

Finally, it is also known to perform the transmission of forces by means of an electric transmission. In this one, all the energy generated by the combustion engine is converted into electric energy by means of a generator. Then, this one is reconverted into mechanical energy by means of an electric motor. Drive controls for electric motors are capable of adjusting any gear ratios between the generator and the electric motor. Hence, a system of this type has the advantage of being controllable particularly well. A drawback, however, are the relatively low efficiency due to the high losses in the controls and electric machines.

The existing driving systems for industrial trucks involve considerable energy losses in certain operating situations. Furthermore, the known systems are incapable of returning energy in braking. Furthermore, emissionless operation is impossible. Another disadvantage of the known driving systems is that the components of the systems require to be designed for the peak load. The mean load acting on the components, however, clearly is below such values. Thus, a large construction expenditure is incurred that is not needed for the mean.

DE 198 03 160 has made known a two-branch driving system for power-driven vehicles. It is intended to meet the requirements to an automobile in a stop-and-go operation in conurbations. The known hybrid drive for power-driven vehicles using a combustion engine provides a first electric machine disposed on a driving shaft of the hybrid drive and a second electric machine the two of which are always operable as a generator and an electric motor and are coupled to each other and to the combustion engine via a two-branch gear transmission. The second electric machine is positioned on a shaft with which a rotary brake is associated which is controllable in dependence on the driving condition of the power-driven vehicle and by which the respective shaft can be located. A stop or arrest of this electric machine with the matching driving shaft is performed especially if the speed thereof falls below a certain limit, i.e. if the second electric machine has a low partial efficiency. This helps avoid overheating the electric machine. The known driving system, however, is unsuitable for industrial trucks since it does not make possible a backward travel at a maximum speed.

DE 197 47 459 has made known a driving system for tractors and agricultural machinery in which the combustion engine is connected, via a hydrostatic transmission, to a summing transmission the further input of which is driven via a second drive branch which is coupled to the driving shaft of the combustion engine via a branch gear transmission. The driving system is intended to utilize the advantages of a hydrostatic drive and a mechanical drive in combination in order to improve the usability of the vehicle drive. This driving system requires two clutches and does not make possible any backward travelling speed at a maximum speed.

It is the object of the invention to provide a driving system for an industrial truck that realizes optimum modes of operation for all driving conditions at an acceptable construction expenditure and a high efficiency and that also enables to be driven within buildings without any exhaust gases.

BRIEF SUMMARY OF THE INVENTION

In the inventive driving system, a combustion engine is used as a primary motor and an electric motor is used as a secondary motor. For example, the output shaft of the electric motor directly acts on a gear assembly the input of which, in addition, is coupled into the shaft of the combustion engine and the output shaft of an adjustable transmission. Connected after the gear assembly, which also can be designated as a summing transmission, is a change-over transmission in order that the forward and backward travels of the industrial truck may be performed under equal conditions. A sensor system measures the speed of the combustion engine, the electric motor, and the output shaft of the change-over transmission and generates respective speed signals for a governing device which controls the speeds of the motors and the gear ratio of the adjustable transmission according to a desired-value signal of a desired-value transmitter actuated by the operator of the industrial truck.

As adjustable mechanical transmissions, various infinitely variable transmissions are imaginable such as a V-belt driven variable transmission, a steel thrust belt driven variable transmission, a steel thrust chain variable transmission, a friction gear variable transmission, an adjustable hydrostatic transmission or a hydrodynamic transducer (a Foettinger coupling).

Various variants are imaginable to realize the gear assembly. In an aspect of the invention, a first planetary gear system such as a planetary mechanism is coupled to the shaft of the combustion engine and a second planetary gear system such as a planetary mechanism is coupled to the driven shaft of the adjustable transmission. The output shaft of the one planetary gear system defines the input shaft of the second planetary gear system and the electric motor is coupled to the input shaft of one of the two planetary gear systems with the torques of the three shafts of the planetary gear systems being at a fixed ratio to each other. The speeds of the shafts adjust themselves in dependence on the operating state.

Alternatively, a provision is made that a planetary gear system be coupled to the shaft of the combustion engine and the output shaft of the adjustable transmission and the output shaft of the planetary gear system and the shaft of the electric motor define the input shafts of a further planetary gear system. Finally, in a further aspect of the invention, a first planetary gear system may be coupled to the shaft of the combustion engine and the shaft of the electric motor whilst its driven shaft defines the input shaft of the adjustable transmission. The driving shafts of the adjustable transmission and the first planetary gear system define the input shafts of a second planetary gear system.

In all aspects of the invention, the power of the combustion engine is branched by the adjustable transmission onto a primary shaft and a secondary shaft. As the primary shaft, the continuous shaft may be referred to whereas the secondary shaft represents the driven-side shaft of the adjustable transmission. Alternatively, the branching of power to the primary and secondary shafts may be performed by a separate two-branch gear transmission. Then, the adjustable transmission is arranged in the secondary shaft. The powers of the primary and secondary shafts will be led together again in the planetary gear system and the gear assembly. Such a driving system has several advantages:

a) The maximum power to be transmitted by the adjustable transmission is reduced. Transmissions having a variable gear ratio generally are of an efficiency which is lower than the one of those having a constant gear ratio. Therefore, the power loss decreases and the overall efficiency of the drive increases b) Because of the lower demands to power, adjustable drives may be used the capacity of which would not be sufficient otherwise, e.g. V-belt variable drives. In addition, the adjustable drive may be dimensioned smaller.

c) The gear ratio between the combustion engine and the output shaft of the driving system may be made to be zero. This enables the vehicle to be kept at stoppage while the combustion engine is running with the flux of power not being interrupted by an engaging and disengaging clutch. In addition, the spread of the gear ratio takes on any magnitude desired in this manner. (The spread referred to here is known to be the relationship between the largest and the smallest gear ratio of an adjustable transmission).

However, a driving system possesses the two first advantages only if a change-over transmission is provided for the reversal of the sense of rotation when a change is made between the forward and backward travels. It is true that the reversal of the sense of rotation could even be realized without any change-over transmission, but solely by varying the gear ratio of the adjustable transmission. Without any change-over transmission, the maximum power to be transmitted by the adjustable transmission at a backward travel at a maximum speed would be larger than the output power of the driving system's driving shaft.

Because the two-strand driving system is coupled to an electric motor secondary drive (an electric machine which may be operated both as a motor and a generator) the advantages below will emerge:

The starter and the light generator may be omitted.

A purely electrical operation is possible, e.g. driving in closed rooms.

Energy recovery may be effected in braking. This reduces the consumption of energy and the requirements to the thermal load-carrying capacity of the operating brakes are lower.

Exerting a rapid, highly dynamic influence on the driving torque and the number of drive revolutions is possible without any problems for a control of the travelling speed. The requirements to the adjustable transmission with regard to the dynamics of variation and the accuracy of the gear ratio are substantially lower.

The combustion engine may be dimensioned smaller because peak power requirements can be met by the additional power of the secondary motor.

BRIEF DESCRIPTION OF THE SEVERAL VIEWS OF THE DRAWINGS

The invention will now be explained in detail with reference to embodiments shown in the drawings.

DETAILED DESCRIPTION OF THE INVENTION

Figure 1:
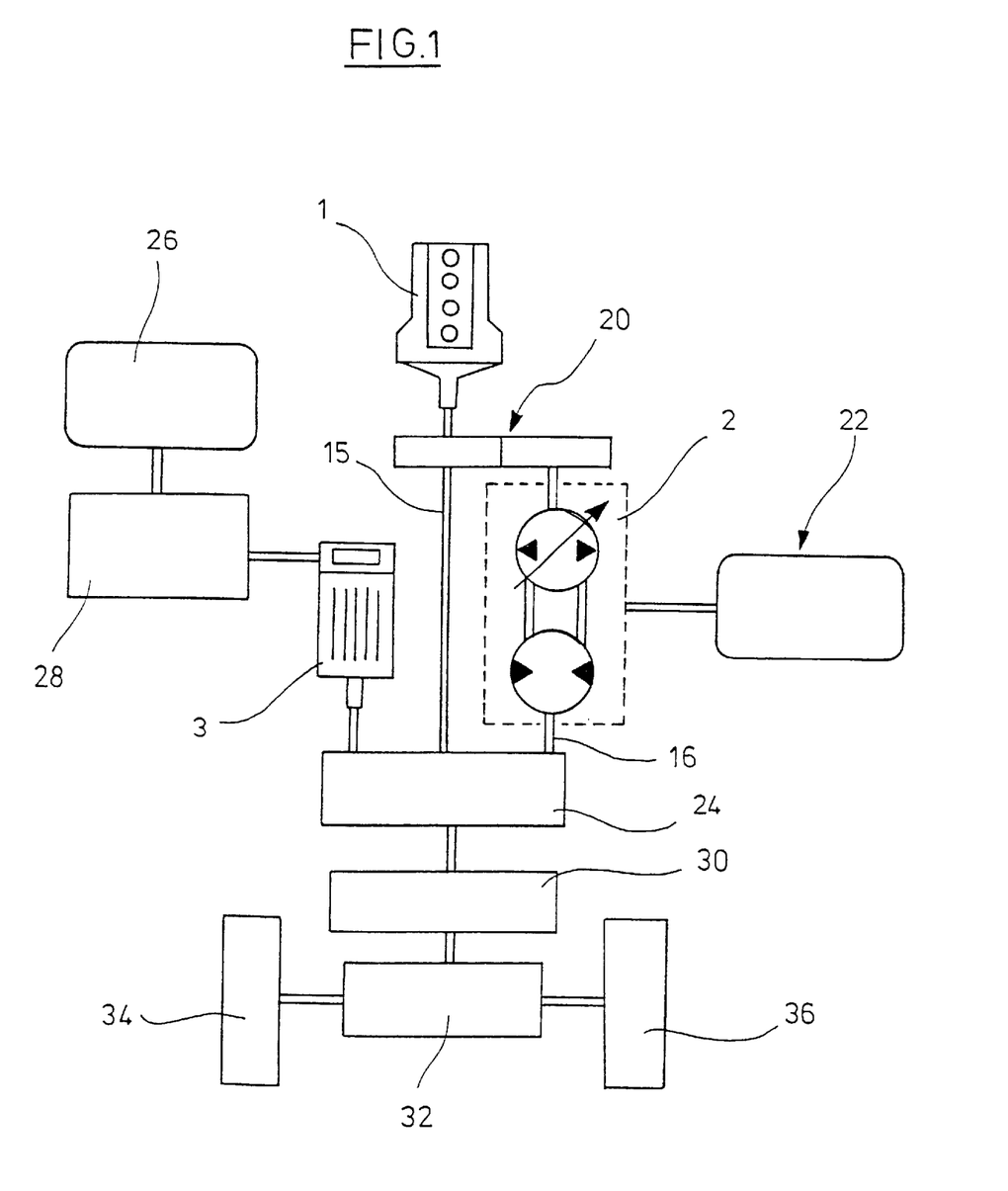
FIG. 1 shows the general schematic diagram of the driving system according to the invention.

Referring to FIG. 1, a combustion engine 1 is shown, preferably a diesel or fuel gas engine, the shaft of which is branched into a primary shaft 15 and a secondary shaft 16 via a two-branch gear transmission 20. The secondary shaft 16 is characterized by an adjustable transmission which is a hydrostatic transmission in the case of the drawing. However, it may also be defined by other infinitely variable transmissions such as a V-belt driven variable transmission, a flat-belt driven variable transmission, a steel thrust belt driven variable transmission, a steel thrust chain variable transmission, a friction gear variable transmission or a hydrodynamic transducer (a Foettinger coupling). Selectively coupled to the hydrostatic transmission may be an accumulator 22 to which some part of the energy flowing in the transmission 2 is fed or which releases energy to the adjustable transmission 2.

The shafts 15, 16 are coupled into a gear assembly 24 into which the shaft of an electric motor 3 is coupled as well. The electric motor 3 is supplied with energy from a battery 26, i.e. via a control circuit 28. The output shaft of the gear assembly 24 is coupled to a change-over transmission 30 which, in turn, is coupled to a differential 32 via which the driving wheels 34, 36 of the industrial truck (not shown) are driven.

Figure 2:
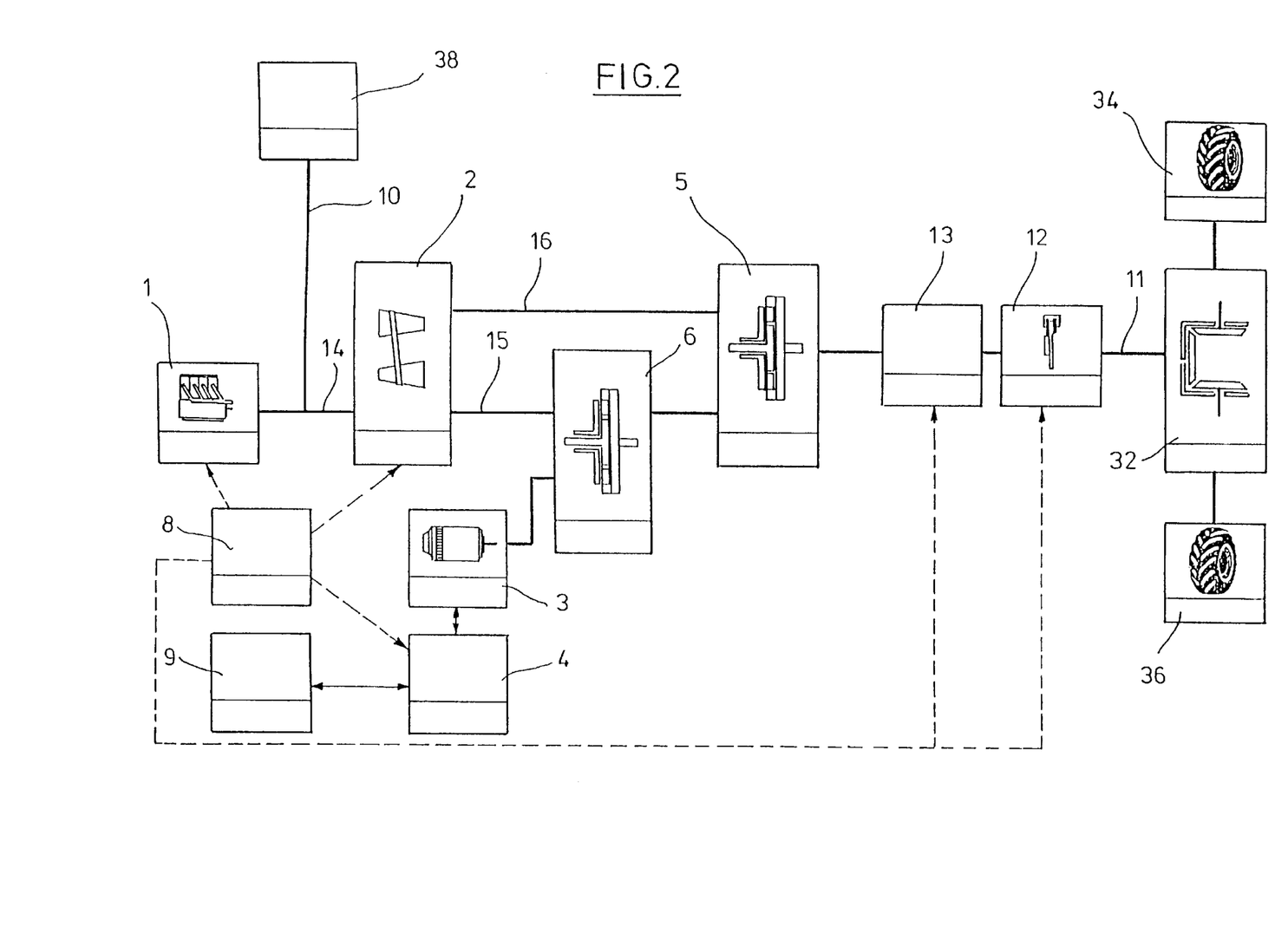
FIG. 2 shows a first embodiment of the system of FIG. 1.

Referring to FIG. 2, a possible realization of the concept of FIG. 1 is shown wherein identical units are indicated by identical reference numbers. In lieu of a hydrostatic transmission, a V-belt driven or flat-belt driven transmission is outlined in FIG. 2. However, this is of no significance for the mode of action. It is seen that a first planetary gear system 5 is provided which is coupled to the driven shaft 16 of the adjustable transmission 2 such as the planet carrier of the planetary mechanism whereas the sun gear is coupled to the output shaft of a second planetary gear system 6 which is connected to the primary shaft 15. Then, the ring gear of the planetary mechanism of the planetary gear system 5 is coupled to the change-over transmission 13 the output shaft of which is coupled to a rotary brake which is seated on the driving shaft 11 of the driving system.

The second planetary gear system 6 also is a planetary mechanism the planet carrier of which is coupled to the primary shaft 15 and the sun gear of which is coupled to the shaft of the electric motor 3. The ring gear 3 is coupled to the sun gear of the first planetary gear system 5.

Coupled to the shaft 14, in a manner not shown in detail, is a shaft 10 which is coupled to a hydraulic pump 38. It serves for operating various functions of the industrial truck which is provided with the driving system shown.

In FIG. 2, the battery is indicated by 9 and a electronic power unit is indicated by 4. A governor 8 serves for adjusting the speeds of the motors 1 and 3 and the gear ratio of the adjustable transmission 2. The governor 8 also controls the change-over transmission 12, the brake 12, and the electronic power unit 4. The double-tipped arrows between the motor 3 and the electronic power unit 4 and between the latter and the battery 9 are intended to suggest that both the motor-driven and generator-driven operations are possible for the motor 3. A sensor system (not shown) detects the speeds of the shafts of the motors 1 and 3 and that of the driven shaft 11 for a control of the drive according to a desired-value transmitter (not shown) actuated by the vehicle operator.

The function of the planetary gear systems 5, 6 is to lead together the power of two shafts according to the direction of the flux of power and to transfer it to the third shaft or to branch the power of one shaft onto the two other shafts. At this point, the torques of the three shafts always are at a fixed ratio to each other whereas the speeds of the three shafts may adjust themselves in dependence on the operating condition. Merely the sum of the three speeds always equals zero. As can be seen, these characteristics may be technically realized, for example, by planetary mechanisms or even differential mechanisms. A common gear mechanism may be used for the change-over transmission 13. The parking brake 12 is needed to enable the start-up the combustion engine 1 by means of the electric motor 3. Apart therefrom, it may be utilized as a stop brake of the vehicle.

The following correlations are valid for the gear ratios between the speeds of the two motors 1 and 3 and the output shafts 10 and 11:

$$I_{1,\,11} = i_{VO}(1 - i_2) \tag{1}$$

$$I_{3,\,11} = i_{EO} \tag{2}$$

$$I_{1,\,10} = i_{VZA} \tag{3}$$

At this point, $i_{VO}$, $i_{EO}$ and $i_{VZA}$ are constant gear ratios and $i_2$ is the respective gear ratio of the adjustable transmission 2. The constant gear ratios may be realized by separate mechanisms (auxiliary transmissions), which are not shown here, or by the configuration of the planetary gear systems 5, 6.

Figure 3:
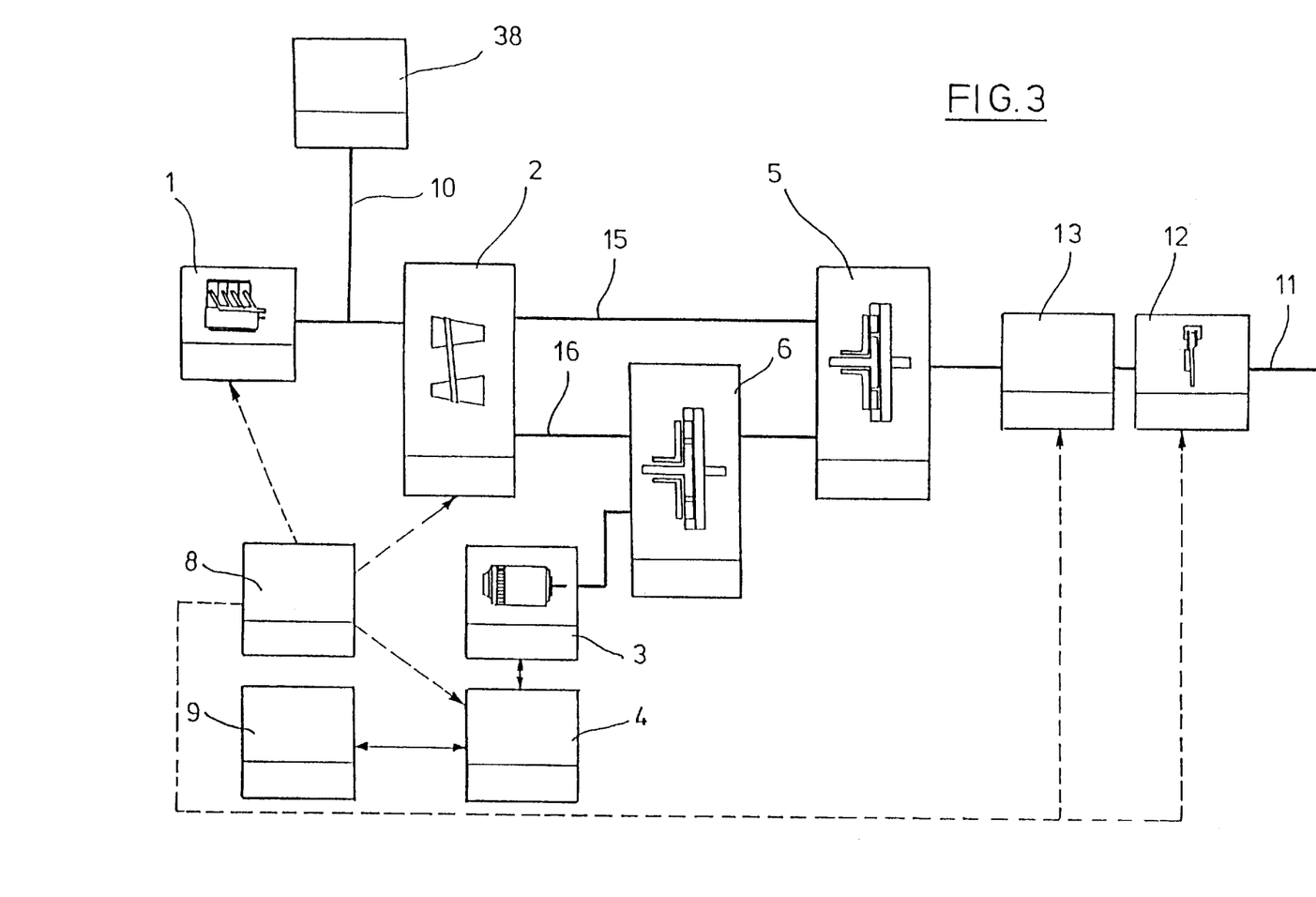
FIG. 3 shows a second embodiment of the system of FIG. 1.
Figure 4:
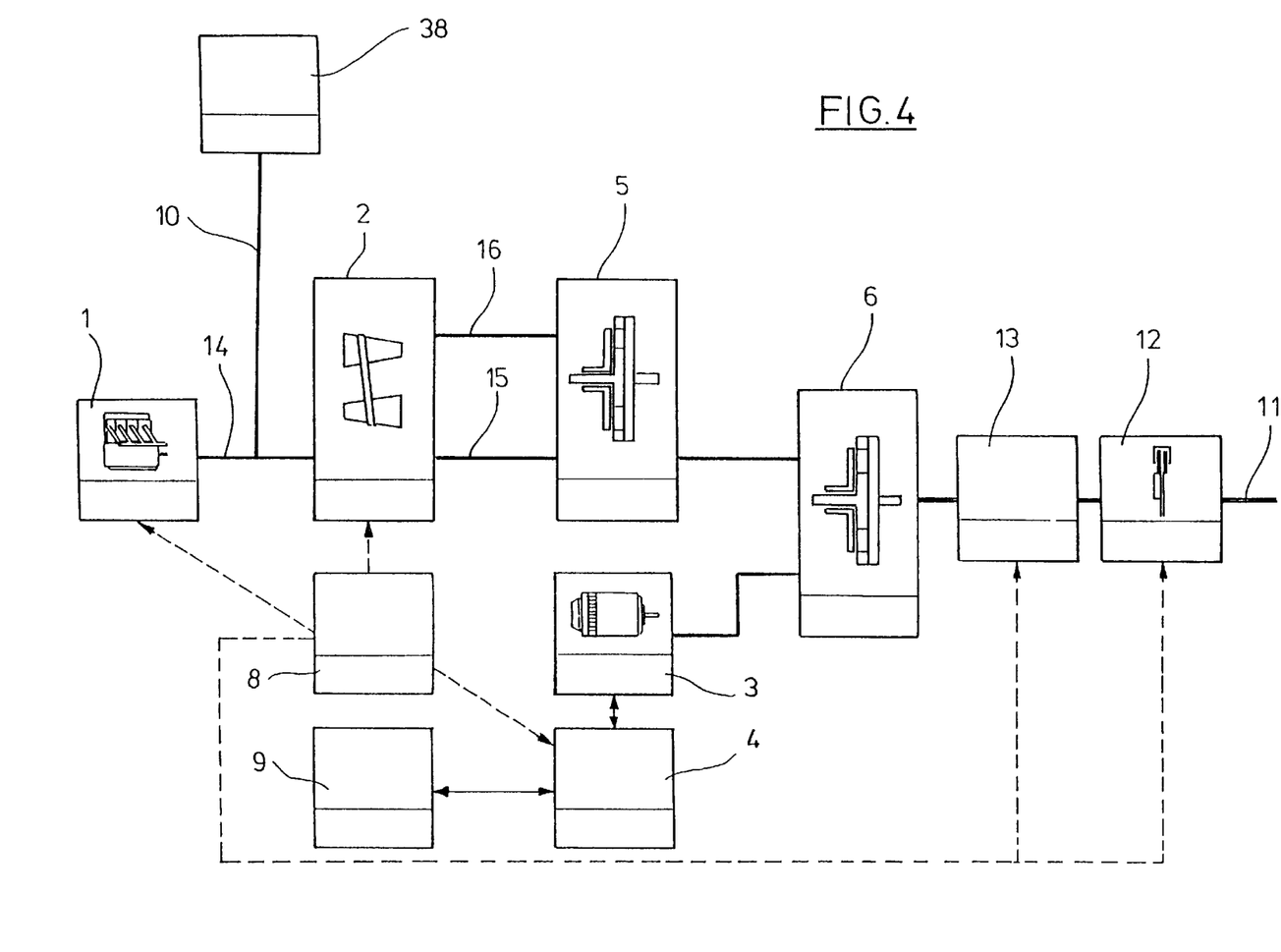
FIG. 4 shows a third embodiment of the system of FIG. 1.

With regard to the gear ratio characteristics, the embodiments of FIGS. 2, 3, and 4 are identical.

The embodiments of FIGS. 2 to 4 solely differ by the arrangement of the planetary gear systems 5 and 6 and the adjustable transmission 2. In the embodiment of FIG. 3, the primary shaft 15 is coupled to the planetary gear system 5 whereas the driven shaft of the adjustable transmission 2 is coupled to the planetary gear system 6. In either case, the electric motor is coupled to the planetary gear system 6. By the way, this is also the case in the embodiment of FIG. 4, in which instance the planetary gear system 6, however, is coupled to the output of the first planetary gear system 5 the inputs of which are defined by the primary and secondary shafts 15, 16.

Figure 5:
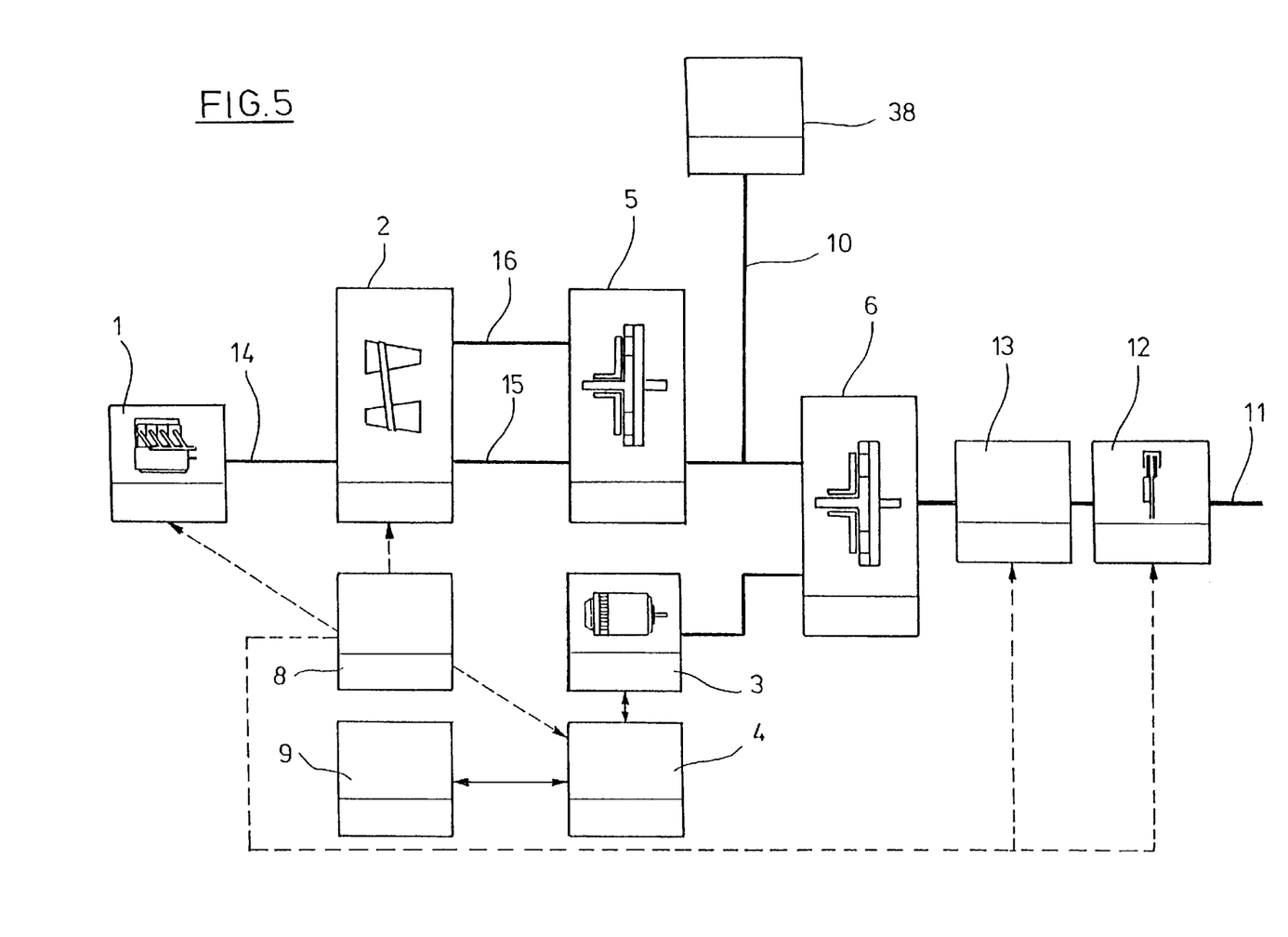
FIG. 5 shows a fourth embodiment of the system of FIG. 1.

In the embodiment of FIG. 5, there is a distinction from the one of FIG. 4 only in that the shaft 10 for the units to perform the further function of the industrial trucks is coupled to the driven shaft of the planetary gear system 5. This embodiment has the advantage that the rotational speed of the shaft 10 which as was mentioned drives the units for the working motions may be regulated within a larger range by modifications to the control variables of the driving system ("accelerator position" and "gear ratio of the adjustable transmission 2").

In particular, the shaft 10 may be brought to a stop even with the combustion engine 1 running. This makes it possible to omit the current control valves for activating the working motions because the speed of the working motion is adapted to be controlled by the speed of the shafts 10.

Hence, the valid gear ratio between the combustion engine 1 and the driving shaft 10 of FIG. 5 is:

$$I_{1,\,10} = i_{VO}(1 - i_2) \tag{5}$$

In contrast, the gear ratios between the motors 1, 3 and the shaft 11 are calculated again according to the above equations (1) and (2).

Figure 6:
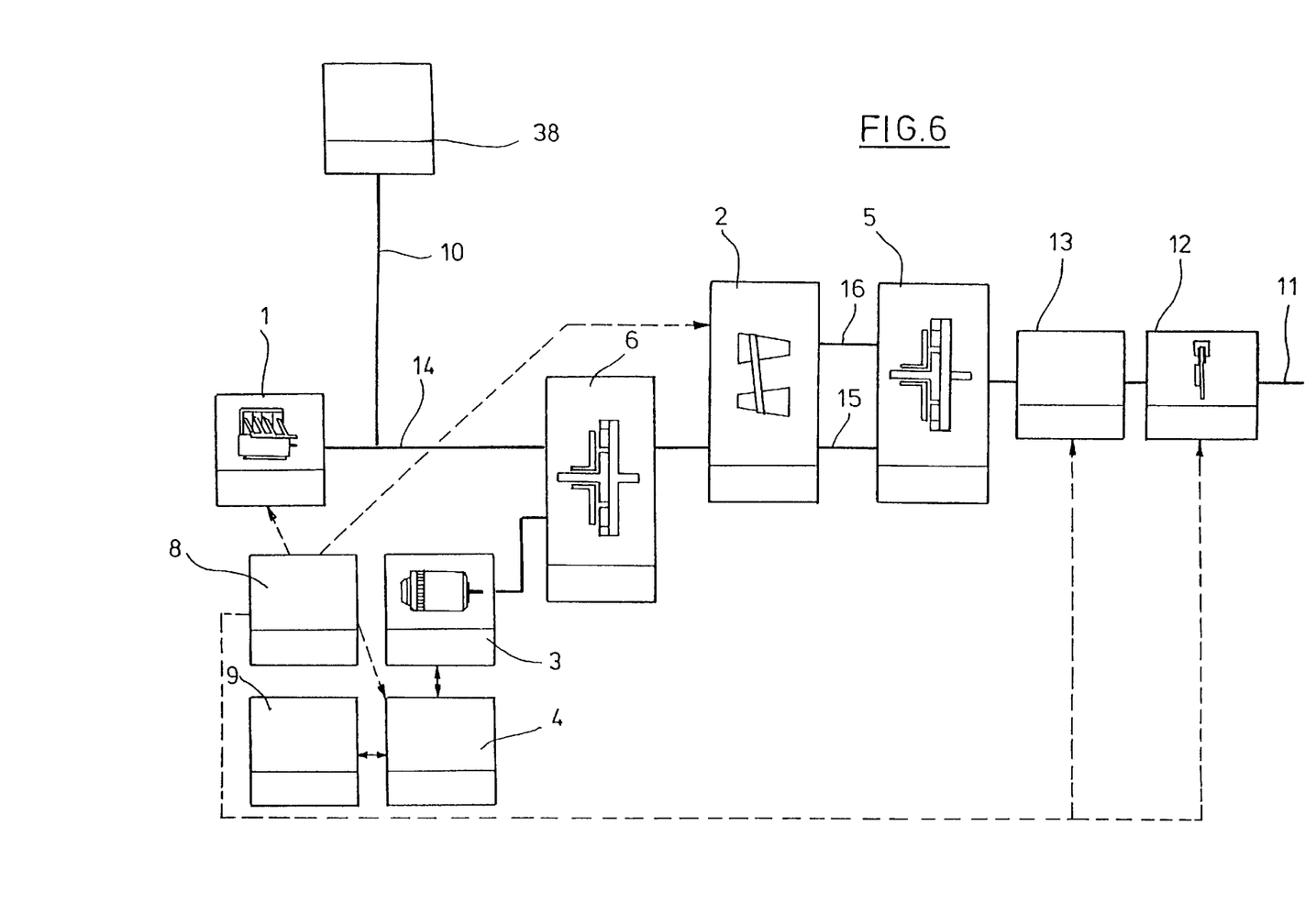
FIG. 6 shows a fifth embodiment of the system of FIG. 1.

In the embodiment of FIG. 6, the adjustable transmission 2 is coupled to the output shaft of the planetary gear system the input of which is defined by the shafts of the two motors 1, 3. The input of the planetary gear system 5 is defined by the primary shaft 15 and the driven shaft 16 of the adjustable transmission 2.

The functions of the driving systems will now be explained for all embodiments shown.

For a start-up of the combustion engine 1, the brake 12 is actuated so that the vehicle axle is uncoupled from the flux of power of the two motors 1, 3. Then, the electric motor 3 is used for starting up the combustion engine 1 because the rotary motion thereof is transmitted to the combustion engine 1 via the transmission system shown. As soon as the combustion engine 1 runs the speeds of the two motors 1, 3 are at a fixed ratio to each other. In some embodiments, this speed ratio is adapted to be influenced by the gear ratio of the adjustable transmission.

When the vehicle is at a stoppage the rotational speeds of the two motors 1, 3 require to be coordinated with each other in such a way that the output shaft 3 is at a rest. At this point, however, a torque may well be transmitted to the driving wheels by the shaft 11. This can be required, for example, in order to keep the vehicle on an oblique plane (a ramp) for a short period with no need to actuate a brake. For a major stop, in contrast, the brake 12 would automatically be actuated by the governor 8. Then, a torque and, hence, a power may be transmitted from the combustion engine 1 to the electric motor 3 so that this one may be operated as a generator for charging the battery 9. Once the battery is completely charged the electric motor 3 will merely be idling along.

Changing the adjustment of the gear ratio between the combustion engine 1 and the output shaft 11 will uncouple the number of revolutions of the combustion engine from the travelling speed. Hence, for a change of the travelling speed, a change is not primarily made to the number of revolutions of the combustion engine, but to the gear ratio. This enables the combustion engine 1 to be operated at operating points in which the power required to drive the vehicle is delivered, on one hand, and efficiency is optimal or the emission of noise or exhaust gases is least, on the other. When the vehicle is sped up the power requirement increases approximately proportional to the speed if the vehicle starts up at a constant acceleration. Therefore, during a start-up, the operating point of the combustion engine 1 requires to be displaced in the characteristic map when the speed increases. This is done along certain characteristic curves. Which of these characteristic curves are used depends on the criteria according to which the operation of the combustion engine is to be optimized. Useful criteria may be minimal fuel consumption, minimal noise or minimal exhaust gas emissions, etc.

As mentioned already, the power requirement increases with an increase in the travelling speed. Hence, the maximum power requirement will arise if the vehicle runs nearly at a maximum speed and is to be sped up more. To meet this power requirement, the electric motor 3 may be used in addition because it feeds an extra power to the driving system. At the beginning of the start-up operation, the vehicle only has a very slow speed and the power requirement is small. To make the combustion engine 1 run at favourable operating points during this phase it is possibly useful to operate the electric motor as a generator. It is opportune to choose the control strategy in a way that the energy balance of the battery 9 is nearly equalized, on an average, across the whole start-up operation. At this point, the strategy according to which the electric motor 3 is operated either as a generator or a motor may be adapted in dependence on the charging state of the battery 9. For example, if the battery charge is to small the electric motor 3 should run more intensely in a generator mode.

When running at a constant speed, particularly through major distances, the power required to overcome the resistances to vehicular motion is substantially met by the combustion engine 1. To this end, the gear ratio of the adjustable transmission 2 needs to be adjusted in such a way that the combustion engine 1, in turn, works at a favourable operating point. The electric motor 3 may be operated either as a generator or a motor, which depends on the charging state of the battery 9. In either case, however, it has to produce a torque counter to the torque of the combustion engine 1. This is necessary because the torques of the three shafts of the planetary gear system 5 always are at a fixed ratio to each other.

In order to recover the vehicle's kinetic energy at least in part while braking it, the electric motor 1 is operated as a generator in this driving state. To this effect, the required braking torque is applied by both the combustion engine 1 and the electric motor 3. To feed the electric motor 3 with a braking power portion as large as possible the electric motor 3 should rotate as rapidly as possible and the combustion engine 1 should rotate as slowly as possible. This can be achieved by a selection of the gear ratio of the transmission 2.

The direction of travel is determined, in the driving system, by the shift position of the change-over transmission 13. By actuating an appropriate operating device (e.g. a switch for the direction of travel or a dual pedal), the vehicle driver informs the governing device in which direction he wishes to drive. If the fork-lift truck is at stoppage at this point the change-over transmission either is shifted into the position belonging to the desired direction of travel immediately after the operating device is actuated. However, if the fork-lift truck runs in the opposite direction it will be braked initially until its speed is zero. During this short-time passage of the driving speed through zero, the change-over transmission is shifted. Immediately afterwards, the fork-lift truck will be accelerated again in the new direction of travel. Hence, shifting the change-over transmission never is done directly by the driver, but always by the governing device 8 in dependence on the actual travelling state and the position of the above-mentioned operating device. This ensures that the change-over transmission is shifted only if the input and output shafts are at stoppage or at least at an approximate stoppage. (The designations "input shaft and output shaft" refer to the change-over transmission rather than to the whole driving system here). This permits to dispense with a mechanism for synchronizing the numbers of revolutions and, moreover, no shocks will occur and no wear will result owing to the shifting operation.

However, the change-over transmission has to be shiftable when under a load, i.e. under the action of a torque because there is definitely a provision that a fork-lift truck, for example, while being on an oblique ramp such as a drive-up ramp, be kept stopped by the driving system. Even in this peculiar state, the transmission needs to be capable of being shifted according to the direction of travel which is desired.

If a change-over transmission is used in which the two senses of rotation of the output shaft may be turned on simultaneously the transmission might get blocked. Thus, the change-over transmission also realizes the function of a parking brake 12. Then, a separate parking brake may be dispensed with.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A driving system for an industrial truck having a driving device and at least one unit for working motions of the industrial truck, comprising:
    a combustion engine (1),
    an adjustable transmission (2) coupled to the engine shaft,
    a gear assembly (24) the first input shaft of which is directly coupled to the shaft of the combustion engine (1) and the second input shaft (16) of which is coupled to the driven shaft of the adjustable transmission (2),
    an electric motor (3) the shaft of which is coupled to a third input shaft of the gear assembly (24),
    a change-over transmission (30) between the driven shaft of the gear assembly (24) and the driving wheels (34, 36) of the industrial truck, a battery (26) which is connected to the electric motor (3) via an electronic power unit (28), a sensor system which measures at least the speeds of the combustion engine (1), the electric motor (3), and the output shafts of the change-over transmission (30) and, if necessary, the charging state of the battery for the electric motor and generates appropriate speed signals, a shaft (10) coupled to the driving system for driving the unit for the working motions of the industrial truck, a governing device (28, 8) which controls the speed of the motors (1, 3) and the gear ratio of the adjustable transmission (2) and actuates the rotary brake and shifts the change-over transmission according to the desired-value signals of the desired-value transmitters actuated by the driver of the industrial truck and on the basis of the output signals of the sensor system.

2. The system according to claim 1, characterized in that the adjustable transmission (2) is a transmission having an infinitely variable gear ratio and is defined by a V-belt driven variable transmission, a flat-belt driven variable transmission, a steel thrust belt driven variable transmission, a steel thrust chain variable transmission, a friction gear variable transmission, a hydrostatic variable transmission or a hydrodynamic transducer.

3. The system according to claim 1, characterized in that the shaft (10) for the unit (38) for the working motions is coupled to the shaft (14) of the combustion engine (1).

4. The system according to claim 1, characterized in that a rotary brake (12) is coupled to the driven shaft (11).

5. The system according to claim 1, characterized in that a planetary gear system is coupled to the shaft of the combustion engine (1) and another planetary gear system is coupled to the driven shaft of the adjustable transmission (2), the output shaft of the one planetary gear system defines the input shaft of the other planetary gear system, and the electric motor (3) is coupled to the input of one of the two planetary gear system wherein the torques of the three shafts of the planetary gear systems are at a fixed ratio to each other. (FIGS. 2; 3).

6. The system according to claim 1, characterized in that one planetary gear system (6) is coupled to the shaft of the combustion engine (1) and the driven shaft of the adjustable transmission (2) and the output shaft of the planetary gear system (5), along with the shaft of the electric motor (3) defines the inputs of a further planetary gear system (6). (FIG. 4).

7. The system according to claim 6, characterized in that the shaft (10) is coupled to the output shaft of the first planetary gear system (5) for driving the units for the working motions. (FIG. 5).

8. The system according to claim 1, characterized in that one planetary gear system (6) is coupled to the engine shaft (1) and the shaft of the electric motor (3) and its driven shaft defines the input shaft of the adjustable transmission (2) and the driven shaft of the adjustable transmission (2) and the driven shaft of the first planetary gear system (6) define the inputs of the second planetary gear system (5). (FIG. 8).

9. The system according to claim 1, characterized in that the change-over transmission (13) is shifted by the governing device (28, 8) if the input and output shafts thereof are at an approximate stoppage.

* * * * *